B. DAHL.
WHEEL TIRE.
APPLICATION FILED MAY 8, 1908.
960,001.
Patented May 31, 1910.
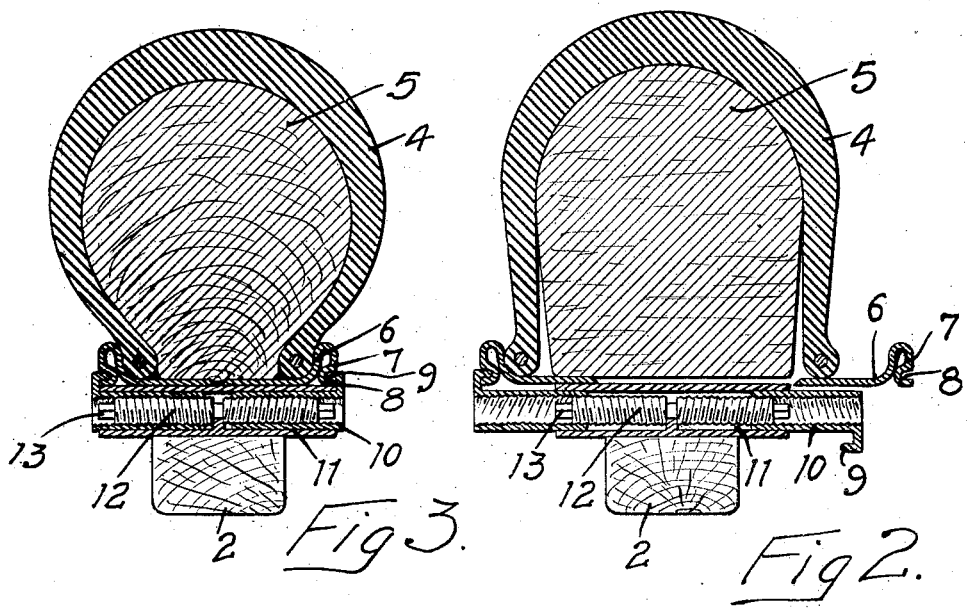
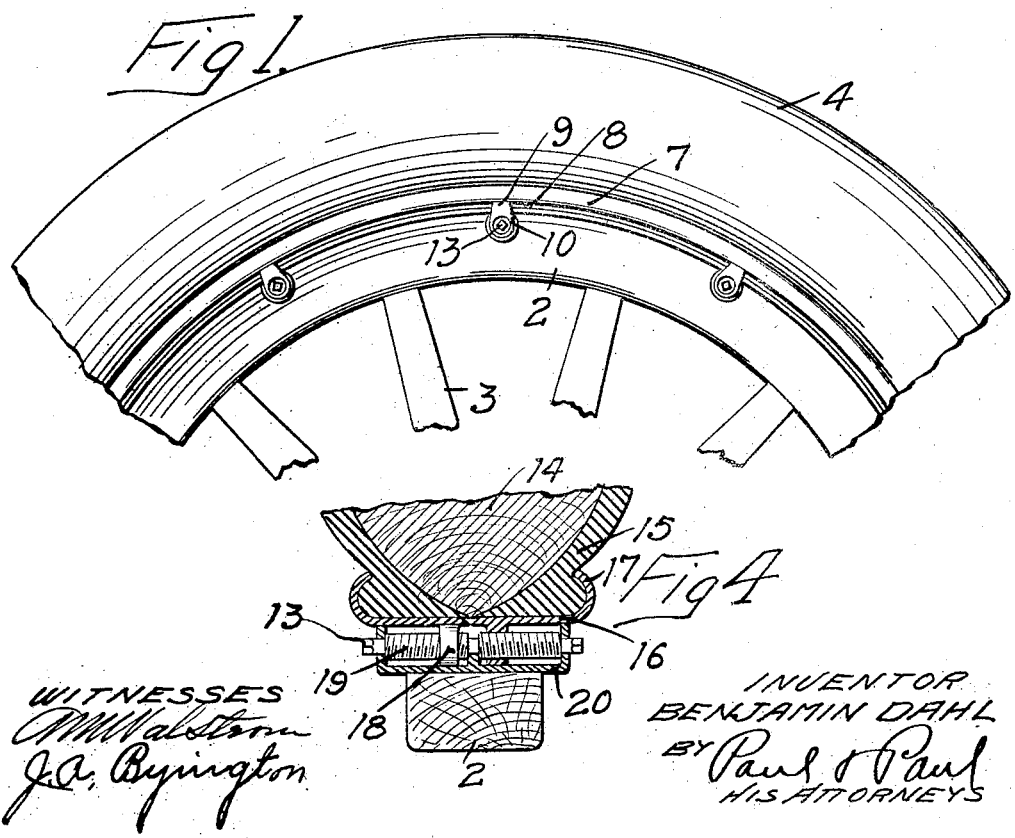
WITNESSES
O. M. Walstrom
J. A. Byington
INVENTOR
BENJAMIN DAHL
BY Paul & Paul
HIS ATTORNEYS

UNITED STATES PATENT OFFICE.

BENJAMIN DAHL, OF MINNEAPOLIS, MINNESOTA, ASSIGNOR TO DAHL PUNCTURELESS TIRE COMPANY, OF MINNEAPOLIS, MINNESOTA.

WHEEL-TIRE.

960,001.    Specification of Letters Patent.    Patented May 31, 1910.

Application filed May 8, 1908. Serial No. 431,680.

*To all whom it may concern:*

Be it known that I, BENJAMIN DAHL, of Minneapolis, Hennepin county, Minnesota, have invented certain new and useful Improvements in Wheel-Tires, of which the following is a specification.

My invention relates to tires designed particularly for use on automobiles and other vehicles, and the object of the invention is to provide a tire having the necessary resiliency for easy riding, and at the same time puncture-proof.

A further object is to provide a tire of a non-pneumatic character and one which will be comparatively inexpensive to manufacture and maintain.

My invention consists generally in an outer tire casing and a filler therefor of resilient material, and means for clamping the casing around said filler, and compressing one portion thereof to cause another portion to bulge or be forced outwardly.

Further, the invention consists generally in various constructions and combinations, all as hereinafter described and particularly pointed out in the claims.

In the accompanying drawings, forming part of this specification, Figure 1 is a detail view of a portion of a wheel tire and felly embodying my invention. Fig. 2 is a transverse sectional view illustrating the outer casing in its released or unclamped position. Fig. 3 is a similar view illustrating the outer casing drawn in snugly around the filler to clamp the inner portion thereof and expand the outer portion. Fig. 4 is a detail sectional view illustrating the application of the invention to a tire of the clencher type.

In the drawing, 2 represents a wheel felly, 3 the spokes therefor and 4 the outer casing of the tire. Generally an inner tube is used with this style of casing and inflated to form the pneumatic tire. The inner tubes are liable to puncture however, cannot be easily mended on the road and must be kept in an inflated condition to obtain the desired degree of resiliency. To obviate this objection to the ordinary pneumatic tire and do away with all danger of puncture and the necessity of inflation, I provide a filler 5 made of a suitable composition that is compressible, elastic and posseses resiliency to a considerable degree. This filler extends entirely around the felly within the casing 4, being somewhat narrower than the space between the edges of the outer casing, as indicated in Fig. 2. When the edges of the casing are drawn together the filler will be compressed near the felly and will bulge out at another point against the casing, and as the pressure increases the bulging tendency of the filler will increase correspondingly, until it completely fills the casing, bearing on all points thereof and supporting the same and yielding sufficiently under pressure to allow the tire to roll over rough or uneven roads without transmitting the jar to the running gear of the vehicle.

Various means may be devised for drawing together the edges of the outer casing 4, and I do not wish to be confined to any particular mechanism employed for this purpose. I have shown in the drawings, however, a compressing means which will perform the desired function and will be comparatively simple and inexpensive to manufacture. This means consists of rings 6 arranged on each side of the casing 4 and having flanges 7 provided with recesses 8 to receive hooks 9 on the outer ends of tubes 10. These tubes are slidable in sockets 11 provided in the wheel felly and are interiorly threaded and adapted to engage right and left hand threads provided on a pin 12 which extends transversely of the felly connecting the tubes 10, and has squared ends 13 to receive a suitable operating key. When this pin is revolved the tubes will be moved toward one another in their socket and the rings 6 will be drawn together, forcing in the edges of the casing 4 against the yielding filler and compelling the filler to bulge out against the casing to compensate for the compression of the filler between the edges of the casing. In other words, the expansion or bulge of the flexible filler will be in direct proportion to its compression at the point where the edges of the casing engage and squeeze the filler. This compression is continued until the desired pressure of the filler on the casing is obtained.

In Fig. 4 the device is adapted for a clencher form of tire, the filler 14 having a rounded inner surface contiguous to the felly that is engaged by the edges 15 of the tire casing. Rings 16 have flanges 17 to engage the edges 15 of the outer casing and lugs 18 are mounted on said rings and have threaded sockets to receive a pin 19 having right and left hand threads thereon, the outer ends of said pin being mounted in a ring 20 secured to the felly 2. These outer ends are squared to fit a suitable key as described with reference to Figs. 2 and 3. The edges of the casing will be drawn in in the same manner as previously described and the effect will be to compress the inner portion of the filler and expand its outer portion.

This invention is applicable to any form of detachable tire using an outer casing, will dispense with all annoyance incidental to the puncturing of pneumatic tires and will greatly reduce the time required in caring for such tires and the expense of maintaining them.

I claim as my invention:

1. The combination, with a wheel felly having transverse sockets therein, of a nonpneumatic tire comprising an outer casing and a filler therefor composed of yielding, resilient material, interiorly threaded tubes fitting within said transverse sockets and slidable therein and having hooks on their outer ends, rings having flanges provided with recesses to receive said hooks, said rings being arranged on each side of the casing and engaging the same, and pins having right and left hand threads thereon engaging the threads of said tubes by means of which said rings can be drawn together and said filler compressed.

2. The combination, with a wheel felly having transverse sockets therein, of interiorly threaded tubes fitting within said sockets and slidable therein and having hooks at their outer end, pins having right and left hand threads thereon and fitting within said tubes and engaging the threads thereof, an outer casing, a filler of resilient material inclosed by said casing, rings provided on each side of said casing and engaging the same, and said rings being adapted to be engaged by the hooks on said tubes, the degree of compression of said casing on said resilient material being regulated by the adjustment of said pins and the relative position of said tubes.

3. The combination, with a felly having transverse sockets therein, of pins within said sockets and having right and left hand threads, an outer casing, a filler inclosed thereby and composed of resilient material, rings provided on each side of said casing and having means to engage the edges of the same, and means engaging said rings and having threads to engage the threads of said pins whereby when said pins are revolved, said rings will be drawn together to compress said filler.

4. The combination, with a felly, of a nonpneumatic tire comprising an outer casing and a resilient filler therefor, rings provided on each side of said casing and having flanges to engage the same, and edges which are adapted to pass between said filler and said felly, said rings being freely movable toward and from one another until the desired degree of compression is obtained on said filler, pins having right and left hand threads thereon and sockets therefor connected with said rings, the ends of said pins being adapted to receive an operating wrench or key, substantially as described.

In witness whereof, I have hereunto set my hand this 4th day of May 1908.

BENJAMIN DAHL.

Witnesses:
J. A. BYINGTON,
C. G. HANSON.